United States Patent Office 3,164,561
Patented Jan. 5, 1965

3,164,561
AQUEOUS COATING COMPOSITION OF DIALDE-
HYDE, A PENTAERYTHRITOL AND HALF ES-
TER AND PROCESS OF INSULATING WIRE
THEREWITH
Robert E. Kass, Springfield, Albert H. Markhart, Wilbra-
ham, and Edward Lavin, Longmeadow, Mass., assign-
ors to Shawinigan Resins Corporation, Springfield,
Mass., a corporation of Massachusetts
No Drawing. Filed Sept. 26, 1960, Ser. No. 58,202
20 Claims. (Cl. 260—29.2)

This invention pertains to the preparation of aqueous coating compositions comprising reactive organic compounds which yield polymeric condensation products that are especially suitable for electric and thermal insulation. More particularly, this invention pertains to the preparation of aqueous solutions containing certain dialdehydes and polyhydric alcohol reactants which reactants when condensed in situ and further cured according to the method hereinafter described form crosslinked resinous products having unexpectedly useful properties.

It is known generally to condense dialdehydes with pentaerythritol to obtain a linear polyspirane resin, such as is taught in Australian Patent 225,640. The known condensates are thermoplastic polymers, however, which are generally too low in molecular weight for optimum mechanical properties. It is also known to preform the linear polyspirane resin and by means of incorporating particular curing agents in the system, e.g.; coating compositions, to thereafter crosslink the polyspirane to obtain cured solid products having excellent thermal and chemical stability. An aqueous dispersion form of the latter system is disclosed by the applicants in their copending application Serial Number 797,016, filed March 4, 1959 (issued as U.S. Patent 3,063,955 on November 13, 1962).

It has now been found unexpectedly, that an aqueous coating composition comprising a solution of a dialdehyde, a pentaerythritol and the half-ester reaction product of an alcohol with a polycarboxy cyclic anhydride material selected from the group consisting of anhydrides and dianhydrides can be cured to form solid products having properties substantially equivalent to the known prepolymer compositions. That the properties of the cured monomeric compositions are substantially equivalent to those of the cured system of a polyspirane resin and the curing agent is surprising in view of the possibility of undesirable reaction between the curing agent and the monomeric reactants in the coating composition prior to the reaction of the latter materials to form a linear polyspirane polymer. In addition, the applicants have now found that the same type of curing method heretofore employed solely to crosslink a system comprising the polyspirane resin and the crosslinking agent may now be employed to effect the polymerization of the monomeric reactants as well as achieve the crosslinking reaction. More specifically, it was formerly necessary to polymerize the monomeric reactants prior to crosslinking by a process which required periods in excess of an hour to achieve a polymer having average molecular weights generally in excess of 700, in order for the subsequently crosslinked product to have the desired chemical and thermal stability. It has now been found, however, that substantially the same degree of chemical and thermal stability can be obtained merely by subjecting the aqueous monomeric composition previously mentioned to the same quick curing step heretofore employed for just crosslinking the already formed polymer. It is therefore possible by means of the method hereinafter more fully disclosed, to obtain the desired solid products directly from the monomeric reactants by a curing process requiring a few minutes at most. The utility of the invention is obvious upon consideration of the elimination of a separate polymerization step and its effect upon the cost of the final solid product to the user.

The cured resin composition of the present invention is believed to be the reaction product of the polyspirane resin and the curing agent. The cure reaction converts the normally thermoplastic polyspirane resin to an infusible crosslinked material having greatly improved chemical, thermal and mechanical stability. Although the applicants do not desire to be limited by any theoretical consideration of the cure reaction, it is believed that the monomeric dialdehyde and pentaerythritol materials first condense during the reaction under the influence of heat and the acidic nature of the cure agent and thereafter further polymerize. As the heating is continued, it is believed that the half-ester cure agent is next converted to the original anhydride material from which the half-ester is prepared, which anhydride thereafter proceeds to crosslink the condensation polymer already formed.

The particular polyspirane resin that is believed formed during the practice of the invention can be represented as having recurring units of the following general formulae:

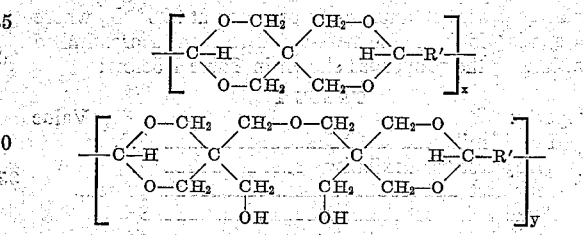

where R' is taken from the group consisting of aliphatic hydrocarbon radicals defined by $(CH_2)_s$ where S is an integer from 2–4 and alkyl and hydroxyl substituted products thereof. The ratio of $x$ to $y$ in the above general formula is dependent upon the relative proportions of monopentaerythritol and dipentaerythritol in the coating composition. The dialdehyde component of the resin can be selected from the group consisting of succinaldehyde, glutaraldehyde, hydroxyadipaldehyde, and mixtures thereof. The pentaerythritol component of the polyspirane condensation product can be monopentaerythritol, dipentaerythritol, or mixtures thereof. The acceptable ratio for the dialdehyde and pentaerythritol components in the aqueous coating composition of the invention is 1–2 moles dialdehyde and 1–2 moles pentaerythritol. Approximately equimolar amounts of the dialdehyde and pentaerythritol in the aqueous coating composition have been found to produce the best results.

In addition to the monopentaerythritol and dipentaerythritol used, derivatives thereof are also usable as well as other polypentaerythritols. The use of about 8% or more dipentaerythritol (by weight of the total pentaerythritol) can add a greater degree of flexibility to the cured compositions, or, depending on reaction conditions, can significantly increase the degree or ease of crosslinking. However, the use of over 50% dipentaerythritol (based on the weight of the total pentaerythritol) can also lead to products possessing increased water-sensitivity or decreased chemical or heat stability.

The invention is practiced in its preferred embodiment as illustrated in the following examples but is not limited thereto. Whenever, in the specification and claims, reference is made to parts and percentages, the reference is to parts and percentages by weight unless otherwise stated.

EXAMPLE 1

An aqueous coating composition was prepared from the following two solutions:

Solution A 90 parts of technical pentaerythritol, which is a mixture of 88 parts by weight of the mixture of monopentaerythritol and 12 parts by weight of the mixture of dipentaerythritol was dissolved in 263 parts of a 25% aqueous solution of glutaraldehyde to which 100 parts of excess water has been added. The pentaerythritol was dissolved by simply stirring the mixture which had been heated to 90–96° C. The clear solution was then cooled to room temperature.

Solution B 22.7 parts of the diethyl ester of pyromellitic acid were dissolved in a mixture of 29 parts ethanol and 51 parts acetone. A clear solution resulted.

Solutions A and B were then mixed at room temperature to give a clear, faint yellow solution which mixture constituted the final coating composition.

The above coating composition was next dip applied to AWG 18 magnet wire by means of passing the wire vertically through a container of the coating composition at approximately 18 ft./min. travel speed and thereafter passing the coated wire through a 12 ft. long conventional type wire enamel tower operated at 390° C., where the coating is dried and heat-cured to form a crosslinked film having the properties shown in Table I below:

TABLE I

| Property: | Value |
| --- | --- |
| Build, mils | 3.0 |
| Wrap test for flexibility | 1. |
| Jerk test | passed. |
| Axial twist test | 96. |
| Abrasion scrapes (700 gram load) | 55. |
| Dielectric life (1 kv. at 200° C. hours before failure) | 452. |
| Cut-through temperature (° C.) | 210. |
| Heat shock test (160° C., 1 hour) | 1 diameter. |
| Dielectric strength (volts/mil) | 2000. |
| Monochlorodifluoromethane extractibles (wt. percent) | 0.53. |

*Build.*—The addition to the diameter of the bare wire, in thousandths of an inch, is the build and is measured by means of a micrometer caliper.

*Wrap test for flexibility.*—The coated wire is first elongated approximately 25% simply by clamping the specimen at both ends and pulling apart slowly. Thereafter, the stretched specimen is wound around circular mandrels whose diameters are 1, 2 or 3 times the diameter of the coated wire. The smallest diameter about which the stretched specimen may be wound for 10 turns without cracks or ruptures is reported.

*Jerk test.*—The jerk test is a measure of the adherence and flexibility of the cured film to the metal wire and is made in accordance with A.S.A. (American Standards Association) specifications, whereby a sample of the cured coated wire is elongated to failure of the wire at an elongation rate of 12–16 feet per second. The sample passes the test if no cracks or loss of adherence appear in the coating more than 1/8 inch from the break after the test.

*Axial twist test for adherence.*—The twist test is conducted on a standard tester identifiable as Twist Counter Model T–1 (Scott Testers), whereby a straight section of coated wire is clamped on both ends and thereafter twisted manually. The number of twists before which the coating separates from the wire is recorded.

*Abrasion resistance.*—Abrasion resistance is determined by a National Electrical Manufacturers' Association Test which consists of repeatedly scraping the surface of the coating with a rigid steel needle at a right angle to the wire until the enamel is worn through. A weight of 700 grams is used to press the needle against the coating and the number of strokes required to scrape through the coating is considered the abrasion resistance.

*Dielectric life test.*—This test is a measure of the length of time for which the coating can be exposed at the particular temperature indicated before it will fail as electrical insulation upon the application of 100 volts on the sample. The test measurements are made in accordance with the provisions of A.I.E.E. (American Institute of Electrical Engineers) Specification No. 57, dated October 1955. The test results are reported as the number of hours before failure for the particular test specimens.

*Cut-through temperature.*—To determine the cut-through temperature specimens of the coated wire are crossed at 90° and a load of five pounds placed at the junction. The temperature is raised at a rate of 10° C. per minute until electrical short circuiting at the junction closes an indicator circuit thereby determining the cut-through temperature.

*Heat shock test.*—Heat shock is defined as the cracking of a stressed wire coating when heated. The test is conducted on specimens which have been wound for 10 turns around circular mandrels whose diameters are 1, 2 or 3 times the diameter of the wire. Next the wound specimens are placed in a mechanical-convection oven heated to 160° C. for one hour, thereafter removed and examined when cool. The smallest mandrel over which no cracks have developed is reported.

*Dielectric strength.*—The dielectric strength of the coating is measured by an A.S.A. procedure whereby the voltage at which the electrical failure between a pair of twisted coated wires occurs is reported on a per unit thickness of the coating basis.

*Monochlorodifluoromethane extractibles.*—Weighted specimens of the coated wire are immersed in the liquid refrigerant for a period of 16 hours. The extraction is conducted in a bomb in order to keep the normally gaseous refrigerant in a liquid state, and the test conditions in the bomb are 205–240 p.s.i. and 37–43° C. The test specimens are removed after the immersion period, dried and re-weighed. The amount of extractibles obtained from the coating is thereafter calculated on a percent weight loss basis.

To illustrate the preparation of other aqueous coating compositions within the contemplation of the invention, Examples 2–6 are shown. The function of a water-soluble hydrophilic colloid in the coating composition is to increase the thickness of liquid coating applied to the wire by the method of Example 1. Example 6 also illustrates the use of a water-soluble salt in the coating composition which salt promotes the cure reaction.

EXAMPLE 2

An aqueous coating composition was prepared having the following composition:

| | Parts |
| --- | --- |
| 2-hydroxyadipaldehyde (25% aqueous solution) | 960 |
| Technical pentaerythritol | 235 |
| Hydroxyethylcellulose | 6 |
| Methyl diester of pyromellitic acid (as 14.4% solids methanol-acetone solution) | 450 |
| Water | 975 |

The properties of the cured film prepared from the above composition according to the method of Example 1 were substantially comparable to the properties obtained for the cured film of said Example 1.

EXAMPLE 3

| | Parts |
| --- | --- |
| 2-hydroxyadipaldehyde (25% solution) | 196 |
| Dipentaerythritol | 100 |
| Hydroxyethylcellulose | 10 |
| Diethylester of pyromellitic acid (22% solids ethanol-acetone solution) | 103 |
| Water | 550 |

The properties of the cured film prepared from the above composition according to the method of Example 1 were substantially comparable to the properties obtained for the cured film of said Example 1.

EXAMPLE 4

An aqueous coating composition was prepared having the following composition:

| | Parts |
|---|---|
| 2-hydroxyadipaldehyde (25% aqueous solution) | 195 |
| 2,5-dimethyl-2-hydroxyadipaldehyde | 19.5 |
| Technical pentaerythritol | 82 |
| Diethylester of pyromellitic acid (10% solids ethanol-acetone solution) | 130 |
| Hydroxyethylcellulose | 2 |
| Water | 125 |

The properties of the cured film prepared from the above composition according to the method of Example 1 were substantially comparable to the properties obtained for the cured film of said Example 1.

EXAMPLE 5

An aqueous coating composition was prepared having the following composition:

| | Parts |
|---|---|
| Succinaldehyde (25% aqueous solution) | 243 |
| Technical pentaerythritol | 90 |
| Hydroxyethylcellulose | 6 |
| 2,3-butylene glycol diester of pyromellitic acid | 17.8 |
| Water | 100 |

The properties of the cured film from the above composition according to the method of Example 1 were substantially comparable to the properties obtained for the cured film of said Example 1.

EXAMPLE 6

An aqueous coating composition was prepared having the following composition:

| | Parts |
|---|---|
| Glutaraldehyde (25% aqueous solution) | 263 |
| Technical pentaerythritol | 90 |
| Hydroxyethylcellulose | 6 |
| Diethyl ester of pyromellitic acid (11% acetone solution) | 115 |
| Zinc acetate dihydrate | 5 |
| Water | 100 |

The properties of the cured film prepared from the above composition according to the method of Example 1 were substantially comparable to the properties obtained for the cured film of said Example 1.

The suitable class of curing agents can be generally characterized as those which are either water-soluble or soluble in miscible mixtures of water and volatile organic liquids. The general class may be more specifically characterized as the acid-ester product of the reaction between an alcohol and a polycarboxylic cyclic anhydride selected from the group consisting of anhydrides and dianhydries. It is believed that such acid-esters will decompose and form the acid anhydride from which the acid ester was derived during the heat-cure cycle, resulting in a substantially crosslinked resinous film having the properties heretofore mentioned. The use of water-soluble acid-esters has certain advantages not possessed by the sparingly water-soluble type for the coating composition of the invention. For example, the water-soluble type of acid-ester curing agent permits the elimination of any organic solvent in the coating composition thereby minimizing any problems of toxicity and flammability attendant to the use of the composition.

The water-soluble class of acid-esters can be selected from those prepared by reacting a polyol type material with the appropriate carboxylic cyclic anhydride according to the following type reaction:

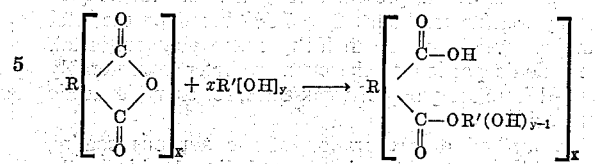

where R is an organic radical seelcted from the group consisting of the aliphatic series, alicyclic series and aromatic series, R' is an organic radical selected from the aliphatic series and having 2–8 carbon atoms, $x$ is an integer from 1–2 and $y$ is an integer from 2–3. For the dianhydrides, R includes another anhydride group and twice as much polyol would be required. Typical acid anhydried materials include pyromellitic anhydride, methyl succinic anhydride, maleic anhydried, and hexachloroendomethylene tetrahydrophthalic anhydride. Typical polyol materials include diols as well as triols, for example, ethylene glycol, butylene glycol, and glycerol. It is preferred to react a molar excess of the polyol material with the anhydride during the preparation of the diester to assure complete reaction and to reduce the tendency for polymer formation. The reaction is conducted by known methods wherein the anhydride is mixed with the polyol material and the reaction is carried out at elevated temperatures, whereby a random mixture of the diester isomers is obtained. The secondary glycols are preferred over the primary glycols because the acid-esters prepared by reacting the secondary glycols with the selected acid anhydrides are more stable in the aqueous coating compositions of the invention. When an organic solvent is used to incorporate the half ester in the aqueous coating composition, the volatile liquid portion of the composition will be predominantly composed of water. The amount of water will generally be over 75% by weight of the total amount of water and volatile, water-miscible, organic solvent.

From 1–30% curing agent based on the total combined weight of the dialdehyde and pentaerythritol in the aqueous coating compositions of the invention has been found to produce the best results. Aromatic anhydrides would be expected to yield products having greater heat stability and aromatic dianhydrides would be expected to produce products with improved mechanical properties.

Example 7, which follows, illustrates the preparation of a preferred diester from the reaction of pyromellitic dianhydride and butylene glycol.

Example 7

Fifty grams of pyromellitic dianhydride are mixed with 100 grams of 2,3-butylene glycol and the esterification of the dianhydride takes place directly by merely heating the mixture to about 80° C. for approximately 1–2 hours and agitating the reaction mixture by mechanical means. The reaction product, a mixture of the two isomers of the dibutylene glycol ester of pyromellitic acid is soluble in the excess butylene glycol present. This entire mixture is water-soluble and can be added directly to the aqueous mixture of the monomeric reactants to make up the coating composition of the invention.

Certain chemical compounds are useful additives to the coating composition as promoters of the cure reaction. For example, zinc acetate dihydrate shown in Example 6 above is illustrative of the useful type additive. The cure promoter increases the rate of cure and thereby reduces the time needed for the cure reaction as well as improves certain properties of the cured resinous product. The class of chemical compounds useful as promoters for the cure reaction, in addition to the organic curing agents hereinbefore described, are water-soluble metal salts. The metallic ion portion of the cure promoter can be selected from the group consisting of lead, lithium, cobalt, manganese, calcium, zinc, iron and cerium. The preferred concentration of the cure promoter in the coating compositions of the present invention is 0.1 to 1.0 percent by weight, or about 0.2 to 7.5% based on the total combined weight of the dialdehyde and pentaerythritol. The anionic portion of the cure promoter is preferably selected from the group of weak acids, for example, acetic and boric acid.

The method of preparation of the aqueous coating compositions of the invention is not believed critical. As has been shown in Example 1, simple mixing of the components of the composition at moderately elevated temperatures produces a clear solution.

Further, while it is preferred to use a two step process of adding an organic liquid solution of the curing agent to the aqueous solution of the monomeric reactants, the direct addition of a readily water-soluble curing agent to the said aqueous solution is believed to be an equivalent method of preparation.

The curing temperature for the present compositions is limited by the temperatures at which the acid-ester curing agent employed will crosslink the polyspirane resin formed from the monomeric reactants of the composition during the heat-cycle. The minimum cure temperature has been found to be approximately 200° C. which is the temperature required for the acid-ester curing agents used to regenerate the anhydride material which crosslinks the polyspirane. Other factors such as the type of curing equipment used and desired time to complete the cure reaction will influence the optimum cure temperature selected. For the compositions in the preceding examples a standard commercial type wire enamel tower was utilized, wherein operating temperatures of 300–450° C. were employed. However, curing at temperatures up to 600° C. are feasible if the curing time is kept to a minimum.

The thickener used in the aqueous coating compositions may be other hydrophilic colloids than the hydroxyethyl-cellulose used in the examples as long as the material is compatible with the coating composition and the films formed therefrom. Other usable colloids include, polyvinyl alcohol, carboxymethyl cellulose, natural gums and derivatives of the aforementioned. These thickeners may range from 1.0 to 5% by weight of the compositions. Further, fillers such as pigments and other polymers, including small amounts of finely dispersed performed polyspiranes, may be advantageously included in these compositions.

The total solids of the aqueous coating compositions will generally be determined by the viscosity desired, drying conditions and by the film thickness or other characteristics required. The amount of reactants will generally range from about 10 to 50% by weight of the composition.

It is to be understood that this invention is not limited to the particular wire coatings disclosed in the above examples. It is obvious from the above test results that a wire coated with the present composition alone would be acceptable as Class B service wire. But it is also obvious to those skilled in the art to modify the application of the resin composition so as to upgrade the high-temperature usefulness of the coated wire by means of known practices in the field. It is possible for instance to utilize the present coating as an undercoat on a wire and to apply as an overcoat one or more of the many compatible insulating varnishes and thereby obtain a coating acceptable as a Class F or higher insulation. It is also not intended to limit the application of the present compositions as electrical insulation for wire merely. For example, the present compositions can also be used as an adhesive agent in the bonding of electrical parts for expected use at elevated temperatures. Further use can be made of the invention compositions as insulation and/or impregnating varnishes for such articles as glass tapes or electrical coils. Other non-electrical uses of this resin are apparent where chemical resistance and temperature stability of the final product are needed, such as surface coatings and others.

In addition to the various applications for the present compositions hereinbefore described, it will be obvious to those skilled in the art that not only other applications are apparent but other compositions and other processes for the manufacture of the compositions are likewise within the scope of this invention.

What is claimed is:

1. An aqueous coating composition comprising (A) an aqueous solution of (1) a dialdehyde selected from the group consisting of glutaraldehyde, succinaldehyde, hydroxadipaldehyde and mixtures thereof, and (2) a pentaerythritol selected from the group consisting of monopentaerythritol, dipentaerythritol and mixtures thereof, in which solution the dialdehyde and pentaerythritol are present in the ratios of 1–2 moles dialdehyde and 1–2 moles pentaerythritol, and (B) a half-ester reaction product of an alcohol with a polycarboxylic cyclic anhydride material selected from the group consisting of anhydrides and dianhydrides, in which coating composition the half-ester is present in the amount of 1–30% of the total combined weight of the dialdehyde and pentaerythritol, said alcohol being selected from the group consisting of methyl alcohol, ethyl alcohol, and aliphatic diols and triols having 2–8 carbon atoms, and said anhydride material being selected from the group consisting of pyromellitic anhydride, methyl succinic anhydride, maleic anhydride and hexachloroendomethylene tetrahydrophthalic anhydride.

2. A composition as in claim 1 wherein the half-ester is soluble in water.

3. A composition as in claim 1 wherein the half-ester is dissolved in a volatile, water-miscible, organic solvent.

4. A composition as in claim 1 wherein the anhydride material is pyromellitic anhydride.

5. An aqueous coating composition as in claim 1 which also contains a thickener.

6. An aqueous coating composition as in claim 1 wherein the dialdehyde is glutaraldehyde.

7. An aqueous coating composition as in claim 1 wherein the dialdehyde is 2-hydroxyadipaldehyde.

8. An aqueous coating composition as in claim 1 wherein the dialdehyde comprises a mixture of 2-hydroxyadipaldehyde with 2,5-dimethyl-2-hydroxyadipaldehyde.

9. An aqueous coating composition as in claim 1 wherein the pentaerythritol comprises a mixture of monopentaerythritol with dipentaerythritol containing about 88 parts of monopentaerythritol and about 12 parts dipentaerythritol by weight of the mixture.

10. An aqueous coating composition comprising a solution of (1) about equimolar amounts of a dialdehyde selected from the group consisting of glutaraldehyde, succinaldehyde, hydroxyadipaldehyde and mixtures thereof with a pentaerythritol selected from the group consisting of monopentaerythritol, dipentaerythritol and mixtures thereof, and (2) a half-ester reaction product of an alcohol with a polycarboxylic cyclic anhydride material selected from the group consisting of anhydrides and dianhydrides; in which coating composition the half-ester is present in the amount of 1–30% of the total combined weight of the dialdehyde and pentaerythritol, said alcohol being selected from the group consisting of methyl alcohol, ethyl alcohol, and aliphatic diols and triols having 2–8 carbon atoms, and said anhydride material being selected from the group consisting of pyromellitic anhydride, methyl succinic anhydride, maleic anhydride and hexachloroendomethylene tetrahydrophthalic anhydride.

11. An aqueous coating composition as in claim 10 containing a volatile, water-miscible, organic solvent for the half-ester.

12. An aqueous coating composition as in claim 10 wherein the anhydride material is pyromellitic anhydride.

13. An aqueous coating composition as in claim 10 which also contains a thickener.

14. An aqueous coating composition as in claim 10 wherein the dialdehyde is glutaraldehyde.

15. An aqueous coating composition as in claim 10 wherein the dialdehyde is 2-hydroxyadipaldehyde.

16. An aqueous coating composition as in claim 10 wherein the dialdehyde comprises a mixture of 2-hydroxyadipaldehyde with 2,5-dimethyl-2-hydroxyadipaldehyde.

17. An aqueous coating composition as in claim 10 wherein the pentaerythritol comprises a mixture of monopentaerythritol with dipentaerythritol containing 88 parts monopentaerythritol and 12 parts dipentaerythritol by weight of the mixture.

18. A process for the manufacture of a solid resinous product comprising heating at a temperature of about 200 to 600° C. of an aqueous solution comprising (1) a dialdehyde selected from the group consisting of glutaraldehyde, succinaldehyde, hydroxyadipaldehyde and mixtures thereof, (2) a pentaerythritol selected from the group consisting of monopentaerythritol, dipentaerythritol and mixtures thereof, and (3) a half-ester reaction product of an alcohol with a polycarboxylic cyclic anhydride material selected from the group consisting of anhydrides and dianhydrides, for a sufficient period to remove the water and cure the resinous product formed, said alcohol being selected from the group consisting of methyl alcohol, ethyl alcohol, and aliphatic diols and triols having 2–8 carbon atoms, and said anhydride material being selected from the group consisting of pyromellitic anhydride, methyl succinic anhydride, maleic anhydride and hexachloroendomethylene tetrahydrophthalic anhydride.

19. A process for insulating an electrical conductor comprising coating the conductor with an aqueous solution comprising (1) a dialdehyde selected from the group consisting of glutaraldehyde, succinaldehyde, hydroxyadipaldehyde and mixtures thereof, (2) a pentaerythritol selected from the group consisting of monopentaerythritol, dipentaerythritol and mixtures thereof, and (3) a half-ester reaction product of an alcohol with a polycarboxylic cyclic anhydride material selected from the group consisting of anhydrides and dianhydrides, and thereafter removing the water and curing the coating at elevated temperatures of about 200 to 600° C., said alcohol being selected from the group consisting of methyl alcohol, ethyl alcohol, and aliphatic diols and triols having 2–8 carbon atoms, and said anhydride material being selected from the group consisting of pyromellitic anhydride, methyl succinic anhydride, maleic anhydride and hexachloroendomethylene tetrahydrophthalic anhydride.

20. A process for insulating wire which comprises coating a bare metal wire with an aqueous solution comprising (1) a dialdehyde selected from the group consisting of glutaraldehyde, succinaldehyde, hydroxyadipaldehyde and mixtures thereof, (2) a pentaerythritol selected from the group consisting of monopentaerythritol, dipentaerythritol and mixtures thereof, and (3) a half-ester reaction product of an alcohol with a polycarboxylic cyclic anhydride material selected from the group consisting of anhydrides and dianhydrides, and thereafter simultaneously removing the water and curing the coating on the wire at a temperature of about 200 to 600° C., said alcohol being selected from the group consisting of methyl alcohol, ethyl alcohol, and aliphatic diols and triols having 2–8 carbon atoms, and said anhydride material being selected from the group consisting of pyromellitic anhydride, methyl succinic anhydride, maleic anhydride and hexachloroendomethylene tetrahydrophthalic anhydride.

References Cited by the Examiner

UNITED STATES PATENTS

| | | | |
|---|---|---|---|
| 2,785,996 | 3/57 | Kress | 260—67 |
| 3,015,643 | 1/62 | Markhart et al. | 117—232 |
| 3,063,955 | 11/62 | Kass et al. | 260—67 |

OTHER REFERENCES

Bjorksten: "Polyesters and Their Application," Reinhold Publishing Company, New York, pages 167 and 168.

D. ARNOLD, *Primary Examiner.*

LEON J. BERCOVITZ, *Examiner.*